Aug. 3, 1926.
B. R. SIMMONS
SEALING DEVICE
Filed June 7, 1923
1,594,472
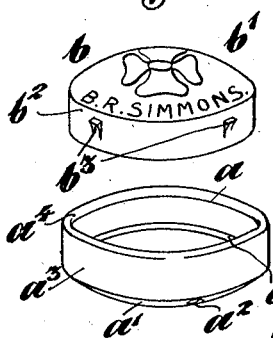
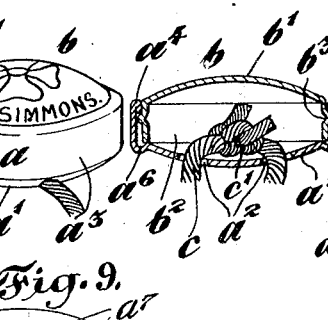
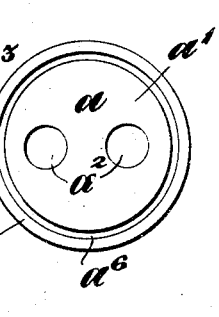
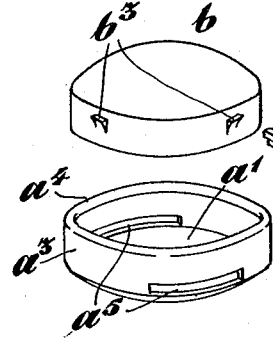
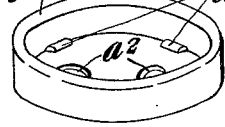
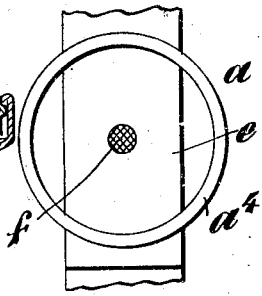
Inventor
Bernard Rintel Simmons Patented Aug. 3, 1926.

1,594,472

UNITED STATES PATENT OFFICE.

BERNARD RINTEL SIMMONS, OF BIRMINGHAM, ENGLAND.

SEALING DEVICE.

Application filed June 7, 1923. Serial No. 644,018.

This invention comprises certain improvements in or relating to sealing devices, applicable for sealing parcels, boxes, cases, sacks, meters, mains, and other containers, or for sealing purposes in general, and adapted for the use of gas, water, and electric supply departments, railway, steamship, and transport companies, bankers, insurance societies, exporters, wine merchants, manufacturers, mail order and other stores, farmers, market gardeners, and others.

The object is to provide a sealing device of a particularly simple and economical construction, particularly secure and effective in operation, adapted to be sealed without necessitating the use of pliers or other tools, and which when once closed and sealed cannot possibly be unsealed without being destroyed or damaged and thereby affording clear evidence of tampering or unauthorized interference with the package or container to which the seal may have been applied.

The invention consists in a metal seal which is adapted to enclose and protect the knot, loop, nail, or other fastening connection to the string, cord, wire, metal band, or the like by which the package or container is secured, said metal seal being of a two-part construction having a snap sealing connection. Advantageously the metal seal comprises a pair of complementary cap-like members, in which said snap sealing connection is provided by means of an upturned rim on the one member engaging within an inturned rim on the other member. Alternatively the metal seal comprises a pair of complementary cap-like members, in which said snap sealing connection is provided by means of a plurality of small peripheral embossments or tangs on the one member engaging within an inturned rim on the other member. The inner member may be further adapted to seat itself within an annular groove in the base of the outer member, or within equivalent recesses provided in the rear of a peripherally spaced series of internal embossments raised from the base of said outer member.

In order that this invention may be clearly understood and readily carried into practice, reference may be had to the appended explanatory drawings, upon which:—

Figure 1 is an elevation in perspective of the complementary parts of a metal seal according to one form of the invention for use with string, cord, or wire, the parts being shown in readiness for sealing assembly.

Figure 2 is a similar view of the seal as assembled in sealing condition.

Figure 3 is a sectional elevation of the seal as shown in Figure 2.

Figure 4 is a plan of the interior of the seal as shown in Figures 2 and 3.

Figure 5 is an elevation in perspective of the complementary parts of a metal seal according to a modified form of the invention for use with a metal band, the parts being shown in readiness for sealing assembly.

Figure 6 is a similar view of the seal as assembled in sealing condition.

Figure 7 is a sectional elevation of the seal as shown in Figure 6.

Figure 8 is a plan of the interior of the seal as shown in Figures 6 and 7.

Figure 9 is a perspective view of a further modified form of the lower cap-like member.

In a convenient embodiment of the invention, as applied to packages or containers such as are secured by string, cord, or wire, the metal seal (Figures 1 to 4) consist of a complementary pair of shallow cap-like members $a$ and $b$ of sheet metal construction and of cylindrical form. The one or lower cap-like member $a$ is open at its upper end and is closed at its lower end by means of a dome-shaped base $a^1$ of an external convexity, which dome-shaped base is pierced with a pair of circular apertures $a^2$ disposed in a diametrical line one on each side of the centre. The cylindrical wall $a^3$ of this lower cap-like member $a$ is slightly inturned by a pressing or like operation to provide a slight inward bead or flange $a^4$ around its upper rim. The other or upper cap-like member $b$ is open at its lower end and is closed at its upper end by means of a dome-shaped top $b^1$ of an external convexity, and the cylindrical wall $b^2$ of this upper cap-like member is of such a diameter externally as to be adapted to fit slidably within the inward bead or flange $a^4$ of the cylindrical wall of the lower cap-like member. The cylindrical wall $b^2$ of the upper cap-like member is formed with an annularly disposed spaced-apart series of small peripheral embossments or tangs $b^3$, advantageously three or four in number, these embossments or tangs being formed by outwardly pressing or punching the metal of said wall at the desired points.

In affixing the seal, the ends of the string, cord, or wire $c$, after being passed around the package or container, are passed through the aperture $a^2$ in the base of the lower cap-like member $a$, and are then knotted, looped, or otherwise fastened within the interior of said lower cap-like member $a$, as shown for example at $c^1$. The upper cap-like member $b$ is then slidably inserted within the lower cap-like member $a$, and the two complementary members are pressed together by hand until the external embossments or tangs $b^3$ of the upper member are forced into a snap engagement with the lower member by passing beneath the inward bead or flange $a^4$ thereon, in which relative position the two complementary cap-like members $a$ and $b$ are effectively and permanently sealed together, as shown in Figures 2 and 3, as the embossments or tangs $b^3$ are inaccessible and can not by any means be withdrawn from their engagement with the bead or flange $a^4$. By this means an effective protecting and sealing cover for the knot, loop or other fastening connection $c^1$ of the string, cord, or wire $c$ is provided. Such use of the device is applied for sealing an ordinary stringed parcel as will be understood.

In a modified embodiment of the invention, as applied to boxes or containers such as are secured by means of a metal band, the metal seal (Figures 5 to 8) again consists of a complementary pair of shallow cap-like members $a$ and $b$, of a construction similar to that already described, but the lower cap-like member $a$, instead of being apertured in its base $a^1$ is provided with an opposite pair of peripheral slots $a^5$ in its cylindrical wall $a^3$, these slots $a^5$ being of a width adapted to accommodate the metal band $e$.

In affixing this form of seal, the ends of the metal band $e$, after being passed around the box or container, are passed through said slots $a^5$, from opposite sides of the lower cap-like member $a$, and the superposed ends of said metal band $e$ are fastened together by means of a nail $f$ or the like driven through them from the top and through the base $a^1$ of the lower cap-like member into the box or container. The upper cap-like member $b$ is then slidably inserted and pressed into a snap engagement within the lower cap-like member $a$, as described with reference to the first embodiment, thereby providing an effective protecting and sealing cover for the nail fastening $f$ of the metal band $e$. Such device is especially adapted for use for sealing an ordinary banded box.

The upper or inner cap-like member $b$, when in its sealing position, may be adapted to seat itself within an annular groove $a^6$ formed in the dome-shaped base $a^1$ of the lower or outer cap-like member $a$ and disposed adjacent the periphery thereof, as shown in the embodiment illustrated in Figures 1 to 4, this seating groove $a^6$ providing a means of strengthening the construction of the device and further avoiding tampering or unauthorized interference with the seal.

Alternatively the dome-shaped base $a^1$ of the lower or outer cap-like member $a$ may be formed with a peripherally spaced series of internal embossments $a^7$, Figure 9, advantageously three in number, raised from said base $a^1$ by a pressing or like operation, the upper or inner cap-like member $b$ being adapted to be seated within the recesses provided in the rear of these embossments $a^7$ adjacent the periphery of the lower or outer member.

The cylindrical walls of the complementary pair of cap-like members $a$ and $b$ may be substantially equal in depth, so that when in sealing position the top of the upper member $b$ lies substantially flush with the upper rim of the lower member $a$, as shown in the embodiments illustrated in Figures 1 to 8.

The complementary members $a$ and $b$ of the sealing device may be externally plain or of any desired ornamental form, or may preferably be adapted to bear pictorial or descriptive matter, for example a name, trade mark, or advertisement, or particulars of the place of origin or date of despatch of any goods enclosed within the package or container to which the seal may be applied.

What I claim as my invention and desire to secure by Letters Patent is:—

A sealing device to enclose a knot or other fastening connection of a string or the like, said device comprising an outer member including a continuous cylindrical wall and a base, in combination with a complementary inner member including a continuous cylindrical wall and a top, said members being engageable one within the other and having snap sealing means comprising substantially semispherical peripheral embossments on the outer side of the continuous cylindrical wall of the inner member and a co-engaging continuous inturned rim on the cylindrical wall of the outer member beneath which rim said embossments engage, the base of said outer member having a plurality of apertures for accommodation of the ends of the string or the like to be fastened, and the rims of said continuous cylindrical walls being arranged to prevent relative axial play between the said pair of members.

In witness whereof I have hereunto set my hand.

BERNARD RINTEL SIMMONS.